July 21, 1959  J. V. MILLER  2,895,138
MEANS AND METHOD FOR FORMING GOGGLES OR THE LIKE
Filed Feb. 3, 1956
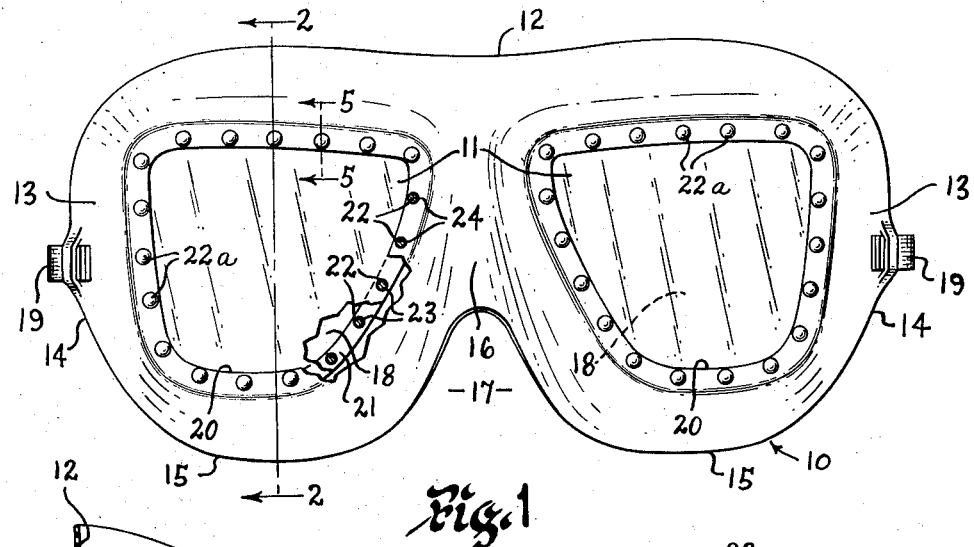
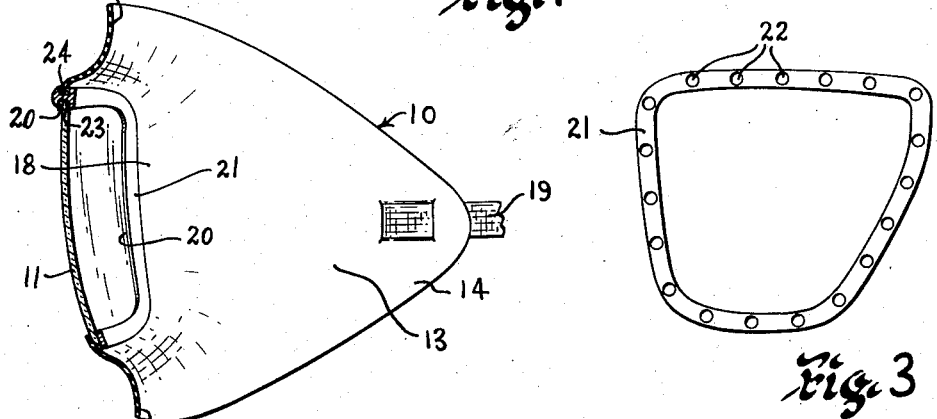
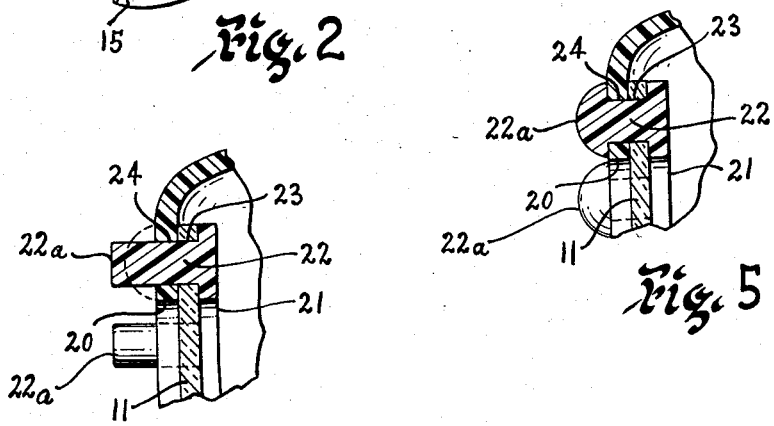
INVENTOR
JOSEPH V. MILLER
BY
ATTORNEYS United States Patent Office 2,895,138
Patented July 21, 1959

2,895,138

MEANS AND METHOD FOR FORMING GOGGLES OR THE LIKE

Joseph V. Miller, Auburn, Mass., assignor to American Optical Company, Southbridge, Mass., a voluntary association of Massachusetts Application February 3, 1956, Serial No. 563,215

3 Claims. (Cl. 2—14)

This invention relates to improvements in eye-protective devices and has particular reference to a novel means and method for mounting lenses in goggles or the like.

In regions such as the Arctic or in the tropical areas where extreme weather conditions necessitate the use of eye-protective devices such as goggles or the like, it is essential, particularly under survival conditions, that said devices effectively protect the eyes of the wearer from being subjected to extreme glare, driving winds, snow, sand, dust etc. or combinations thereof, which may be inherent to a particular region. However, it has been conventional to design such goggles specifically for use only in a particular region. That is, one type of goggle would be constructed for use in very cold geographic regions whereas another type of goggle would be constructed for use in very warm and tropical regions or the like. Such goggles of known constructions heretofore which were suitable for use in one region were not of such a construction as to be satisfactory in another and, in many instances, embodied complicated lens or eye shield assemblies which were difficult, expensive and time-consuming to assemble. For example, one very satisfactory prior art assembly, from the viewpoint of attachment means, embodied the provision of spaced individual rivets which were extended through spaced aligned openings in the lens or shield throughout the periphery thereof and in an overlying portion of the support for said lens or shield. This arrangement, however, was not practical to manufacture because each rivet had to be handled individually in placing it in the aligned openings and had to be subsequently headed over individually as is conventional practice with rivets. Since a multiplicity of such rivets are required in one assembly, such a procedure was too time-consuming and expensive. Also, the materials of which such earlier goggles were made, if satisfactory for use in cold temperatures, were not satisfactory when very warm and humid conditions were encountered, such materials being subject to mildew and the like.

The new and improved goggle of the present invention, however, comprises a resilient or flexible face piece and flexible lenses and incorporates simple and inexpensive yet highly effective non-metallic lens attachment means and method of making the same which are adapted for use, in all temperatures and varying weather conditions including the most extreme heat and extreme cold.

It is, accordingly, a primary object of the present invention to provide simple, rapid, inexpensive and highly efficient non-metallic means and method for mounting a lens or lenses in a thin wall flexible preshaped body member or face piece of a goggle, or the like, in a single or dual operation and in such a way as to provide a durable and sturdy structure adapted for use under all kinds of weather conditions including extreme heat and extreme cold.

Another object of the invention is to provide an inexpensive and durable survival goggle, or the like, which is of a flexible type and which employs lens attachment means of a somewhat flexible nature adapted to provide a secure connection between the lens and the flexible supporting frame or body portion of said goggle regardless of the consequent flexing encountered during normal uses thereof as well as a snug fitting of the body portion to the face of the wearer thereof.

Another object is to provide novel means and a method of attaching a flexible lens or lenses to the flexible body portion of a goggle or the like in such a way as to provide a completely non-metallic structure so as to be useable under all conditions of extreme cold, as well as formed of a material which is highly resistant to mildew and high temperature so as to be useable also in humid and tropical regions.

It is a further object of the invention to provide improved means for mounting a flexible plastic lens or lenses in an all-plastic flexible goggle or the like by all-plastic retaining means in a rapid and economical manner and by a novel method which will not be injurious to the plastic materials being employed or later cause said materials to check or crack when subsequently flexed during usage thereof under extreme weather conditions.

It is also an object of the present invention to provide a lens attachment means of the above character comprising a non-metallic retaining ring having a plurality of integrally formed spaced non-metallic projections thereon, and which ring may be used in assembling and retaining the lens or lenses of the goggle in the body portion thereof in a single operation and which projections may be simultaneously or thereafter "headed over" by the application of controlled heat and pressure in a single operation so as to retain said lens or lenses in a permanently attached relation with the goggle.

Other objects and advantages of the invention will become apparent from the detailed description which follows when taken in conjunction with the accompanying drawings in which:

Fig. 1 is a front elevational view of a survival goggle or the like embodying the invention, portions thereof being broken away to more clearly show parts thereof;

Fig. 2 is a cross-sectional view taken substantially on line 2—2 of Fig. 1 and looking in the direction of the arrows;

Fig. 3 is a front elevational view of one of the lens retaining members employed in Fig. 1;

Fig. 4 is an enlarged sectional view taken substantially upon lines 5—5 in Fig. 1 and illustrating a portion of the lens retaining member and adjacent parts in Fig. 1 during assembly and prior to same being secured in place; and Fig. 5 is an enlarged fragmentary sectional view taken on line 5—5 of Fig. 1 and similar to Fig. 4 but illustrating a portion of the lens attachment means in its final assembled relation relative to adjacent parts of the goggle.

Referring more particularly to the drawings wherein like characters of reference designate like parts throughout the several views, a goggle construction embodying the invention is shown and comprises a flexible thin walled molded or otherwise preformed resilient main body member or face piece 10 having a pair of lenses or the like 11 mounted thereon. The facepiece 10, preferably formed of a durable yet resilient inorganic plastic material, is provided with an upper transversely extending brow portion 12 shaped generally to engage and fit the forehead of a wearer and a pair of integral side portions 13 extending downwardly and rearwardly from said brow portions 12 at opposite sides thereof. The side portions 13 are each provided with rear edge parts 14 contoured to the general shape of the temporal side portions of the wearer's face.

The side portions 13 and rear edge part 14, at opposite sides of the goggle, are continued downwardly and inwardly to form lower portions, as indicated at 15 in Figs. 1 and 2, following the general contour shape of the cheeks of the wearer and connecting with a nasal portion 16 of the face piece 10. The nasal portion is recessed at 17 so as to receive the lower portion of the wearer's nose, while that part of the nasal portion 16, which extends between the center of the brow portion 12 and the recess 17, is formed to protrude slightly outwardly and thus conforms to the general contour characteristics of the bridge area of the wearer's nose. In this manner, there is formed by forward areas of the parts 12, 13, 15 and 16 what may be called a frontal portion of the goggle within which is provided a pair of separately defined enclosed eye chambers 18 located mainly between the eyes of the wearer and the lenses 11 when the goggle is in place upon the face of the wearer thereof.

Since the main body member of face piece 10 is formed of a relatively thin resilient material, as mentioned above, the preshaped marginal edges thereof will readily and intimately engage and conform to the general contour shape and facial characteristics of most individuals when properly positioned for use. A flexible headband 19 extends through a pair of slots in each of the rear edge portions 14 and has its ends thickened or shouldered so as to be anchored thereby. Thus, there is provided means for retaining the goggle in position of use.

The face piece 10 is further provided with a pair of sight openings 20 which are each formed of a size and shape sufficient to provide the wearer of the goggle with a relatively large field of view as well as affording at the same time a very desirable amount of peripheral vision. The lenses 11, being slightly larger and complementary in shape to said openings 20, are each secured in place in overlying relation with the inner surface of the face piece 10 by novel lens retaining means 21 which will now be described in detail.

Each lens retaining means 21 is in the form of a flexible ring-like member (see Fig. 3) and a plurality of spaced projections 22 are integrally formed and extend outwardly on one side thereof substantially equal amounts. A plurality of spaced perforations 24 are provided in the face piece 10 and are positioned about and near the edge of each of the openings 20. Similarly, each of the lenses 11, which are preferably formed of a suitable flexible light-transmitting or light-filtering plastic or the like, are likewise provided with a plurality of spaced perforations 23 formed in and adjacent the peripheral edge thereof, and, as will be readily appreciated, these perforations are so arranged as to be aligned with the perforations 24 of the face piece 10 when each lens is positioned in overlying assembled relation with a respective sight opening 20, as shown in the drawings.

Ring-like retaining members 21 are constructed of a readily formable thermoplastic material, such as a polyethylene or the like, and are contoured to have substantially the shape of the periphery of the lenses 11, with the outer dimensions thereof approximately equal to the outer dimensions of lenses 11 and the inner dimensions approximately equal to the dimensions of the openings 20. This permits the retaining members 21, when in assembled position, to be located in overlying relation with the lenses 11 and face piece 10 adjacent the edges of openings 20 without having these parts restrict the vision through said openings 20.

As stated previously, a plurality of outwardly extending spaced projections 22 are preferably formed integrally upon one side of each retaining member 21 and these projections are spaced therealong at distances apart corresponding to the spacings of the perforations 23 and 24 in the lenses 11 and in the face piece 10 respectively. These projections 22 are each of such a diameter as to approximately equal the diameters of perforations 23 and 24. Thus, they nearly completely fill the perforations when they are simultaneously inserted therein.

In mounting the lenses 11 upon face piece 10, the lenses are positioned in overlying relation or register with the sight openings 20 and oriented to align perforations 23 therein with the perforations 24 of the face piece 10, whereupon the projections 22 carried by the retaining members 21 are simultaneously inserted as a unit through perforations 23 and 24, from a direction rearwardly of the lenses, in the manner shown in Fig. 4 and by an amount sufficient to cause the retaining members to engage the lenses. The projections are of substantially equal lengths sufficient to cause the ends 22a thereof to extend outwardly of the openings a predetermined amount to permit them to be simultaneously or thereafter headed over by suitable heat and pressure applying means (not shown) to permanently "lock" the lenses in substantially hermetically sealed relation with the face piece 10 as best illustrated in Fig. 5.

Since the projections are of nearly the same diameter as the perforations and are in close relation to one another, it can be seen that, after having been headed over as described, said perforations are completely filled and no wind, sand, snow, etc. will be permitted to pass into the eye chambers 18 through the perforations.

By properly locating the projections in close enough relation to each other, a permanent yet flexible seal can be readily provided between the edge portions of the lenses 11 and the edges of the sight openings in face piece 10 which will not gap nor separate subsequently during normal flexing of the assembly even under severe conditions of heat or cold.

It is to be particularly noted that one of the distinct advantages of the above-described retaining means and method of mounting lenses in the goggle openings is the provision of the retaining rings 21 and the plurality of projections integrally formed thereon. Such a unitary arrangement permits all of said projections to be quickly and efficiently assembled in the perforations in the lenses and face piece by a single operation. In fact, these parts might very well be arranged (with the lenses and face piece unperforated) in aligned relation and thereafter have a suitable power-driven tool perforate these parts simultaneously in a first operation, simultaneously insert the ring and projections in a second operation and simultaneously heat and head over all the rivets during said operation or said heating and heading over may be performed in a third operation through the use of heated plungers having their ends shaped to form the shape of heads desired or by other suitable means.

By using an inorganic material such a polyethylene plastic, or the like, in forming the component parts of the above-described structure, and by the use of heat and pressures at a low enough temperature to prevent injury to the physical and mechanical properties of the material during the "heading" operation, a sturdy yet highly flexible goggle construction can be provided; one which will not mildew in storage in damp climates, nor check or crack when flexed during use in extremely cold temperatures, such as would be experienced in the Arctic regions or during flying at high altitudes. Also, by construction the face piece 10 of a substantially opaque material and the lenses 11 of a light-filtering or otherwise treated transparent material, the goggle will afford the wearer thereof adequate protection against glare even when in use in the above-mentioned regions.

From the foregoing description, it can be seen that a simple, inexpensive yet highly efficient flexible all-plastic eye-protective device is provided which may be used for protection, even under survival conditions, in all kinds of temperature and varying weather conditions. Thus, new means and a novel method have been provided for accomplishing all of the objects and advantages of the present invention, and it will be understood, of course, that various omissions, substitutions and changes in the forms and details of the embodiment illustrated may be made by those skilled in the art without departing from the spirit of the invention, as defined by the appended claims.

Having described my invention, I claim:

1. The method of securing a plastic lens in intimate relation with a goggle frame, said method comprising the steps of forming a goggle frame having a sight opening in the front wall portion thereof, forming a lens of a predetermined size larger than the sight opening and with a peripheral shape similar to the shape of the sight opening, forming a ring-like element with a shape similar to the lens and with a plurality of integral projections extending outwardly of a side thereof to provide a unitary plastic connecting member, forming spaced openings in said lens adjacent the periphery thereof, forming spaced openings in the goggle frame adjacent the sight opening, positioning said lens in said goggle frame so as to overlie said sight opening with the spaced openings aligned, simultaneously inserting said projections in said aligned openings so as to extend therethrough, and controllably heating and pressing the exposed ends of said projections so as to form head portions thereon and to retain said lens in intimate attached relation with said goggle frame.

2. The method of mounting a lens in a goggle frame having a sight opening therein, said method comprising forming a series of closely spaced perforations in said frame so as to extend around said sight opening and adjacent the edge thereof, forming a lens with a series of correspondingly spaced perforations adjacent the outer edge thereof, positioning said lens in overlying relation with said opening and so as to have the perforations therein positioned in aligned relation with the perforations in said frame, simultaneously inserting a plurality of projections integrally carried by a ring-like retaining member so as to extend through corresponding aligned perforations in said lens and in said frame, and controllably heating and pressing the exposed ends of said projections to form same into head portions serving to retain said lens in intimate attached relation with said frame.

3. A protective goggle of the character described comprising a preformed facepiece of thin wall flexible plastic material having a sight opening in a front portion thereof and a second portion surrounding said front portion and arranged to fit closely and protectively against a wearer's face, a transparent flexible plastic lens positioned with all parts of its peripheral edge in overlying continuous contacting relation with the endless inner edge of said front portion surrounding said sight opening, said peripheral edge and said endless inner edge each having a like series of spaced perforations therein, the perforations of one series overlying in paired aligned relation the perforations of the other series, and a flexible all-plastic endless ring-like lens-retaining member having a similarly arranged series of spaced integral projections extending outwardly from one side thereof and through each pair of aligned perforations in said edges, said projections having their free ends headed over in such a fashion as to permanently retain said adjacent edge portions of said lens and said thin wall in sealing relation to each other.

References Cited in the file of this patent

UNITED STATES PATENTS

| | | |
|---|---|---|
| 295,242 | Genese | Mar. 18, 1884 |
| 2,435,653 | Maurer | Feb. 10, 1948 |
| 2,583,304 | Pipher | Jan. 22, 1952 |

FOREIGN PATENTS

| | | |
|---|---|---|
| 650,869 | Germany | Oct. 2, 1937 |
| 511,295 | Belgium | May 31, 1952 |